Jan. 15, 1935.   D. W. VAN DONGEN   1,987,879

PROCESS OF DECANTING INDIGO SLURRIES

Filed Oct. 13, 1930

Inventor
DICK WILLIAM VAN DONGEN

Patented Jan. 15, 1935

1,987,879

UNITED STATES PATENT OFFICE

1,987,879

PROCESS OF DECANTING INDIGO SLURRIES

Dick William van Dongen, Buffalo, N. Y., assignor to National Aniline and Chemical Company, Inc., New York, N. Y., a corporation of New York Application October 13, 1930, Serial No. 488,457

8 Claims. (Cl. 210—51)

This invention relates to improvements in the decantation of indigo slurries.

In the production of indigo by fusing phenylglycine in caustic alkalis, drowning the fusion mass in water and aerating the dilute fusion mass to oxidize the leuco indigo and indoxyl to indigo, a slurry of indigo in dilute caustic alkali liquid is produced, in which the indigo has a lower specific gravity than the suspending liquor, and therefore tends to rise to the surface. Generally it is found to be uneconomical to filter the dilute indigo slurry in a rotary drum vacuum filter because of the great amount of liquor which must pass through the filter. For this reason the indigo slurry heretofore has been concentrated by decantation, i. e., by permitting the indigo slurry to stratify into two layers. The top layer contains the concentrated indigo slurry which is skimmed off and can be economically filtered in a rotary drum vacuum filter. The lower layer is clear aqueous caustic alkali. Considerable difficulty has heretofore been experienced in operating a continuous decanter for concentrating the indigo slurry due to variations in the conditions affecting stratification.

One object of the present invention is to secure greater efficiency in the decantation of indigo slurries. Another object is to decrease the time required for decantation of indigo slurries. These and other objects will be apparent from a consideration of the following disclosure.

According to the present invention I have found that the time required to effect decantation of indigo from a dilute caustic alkali slurry depends on the proportions of indigo, caustic, alkali and water present in the slurry and on the temperature of the slurry at which decantation is performed. With slurries of the same content of indigo, caustic alkali and water the time required for decantation to occur varies inversely as the temperature of the slurry is increased. That is, the higher the temperature at which decantation is performed the less time will be required to secure stratification of the slurry into two layers. Furthermore, the temperature at which the maximum concentration of indigo occurs in the minimum time, i. e., the temperature of greatest efficiency, is not the same for all compositions of indigo slurries.

Figure 1:
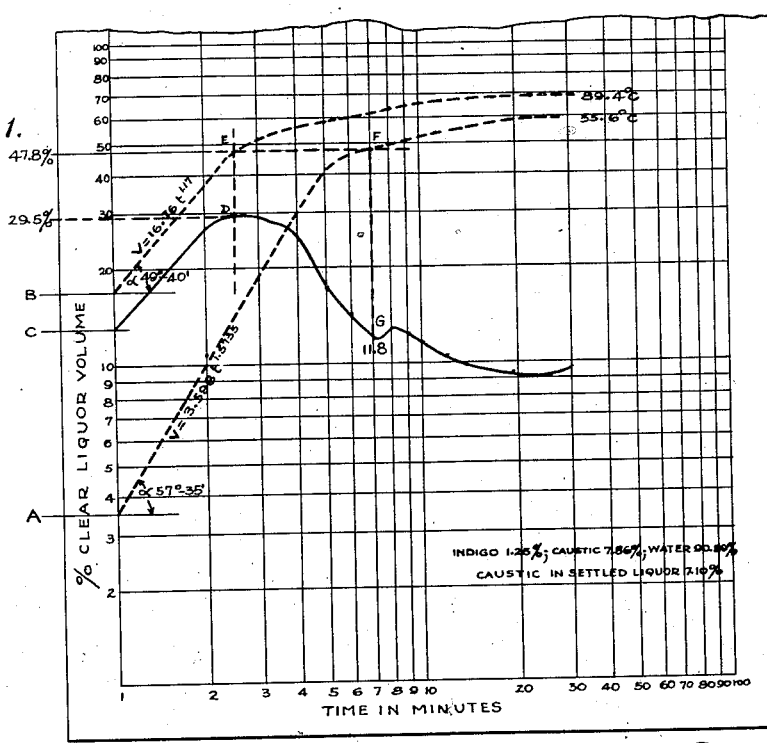
Figure 2:
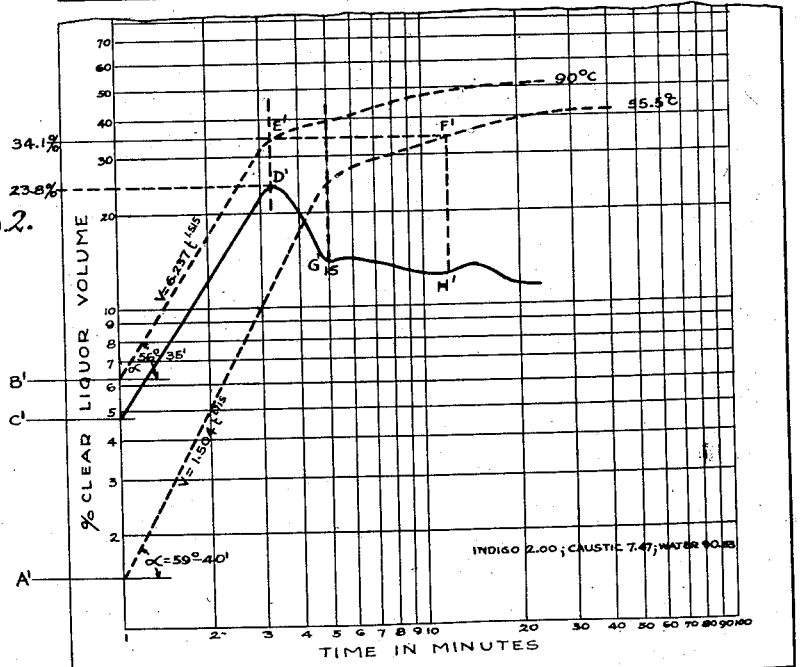

The accompanying drawing, Figures 1 and 2, show curves plotted on logarithmic paper illustrating the relation of temperature and composition to time of stratification. Time in minutes is plotted as abscissæ and per cent. proportion by volume of clear liquor to total volume is plotted as ordinates.

Figure 1 represents a slurry composed of 1.25 per cent. indigo, 7.86 per cent. caustic alkali, and 90.89 per cent. water. Curve A is plotted on points experimentally determined and represents decantation carried out at 55.6° C. the straight line portion of which can be represented by the formula $V=3.598t^{1.5735}$, and has an angle $\alpha$ to the horizontal of 57° 35'. Curve B is plotted on points experimentally determined and represents the decantation carried out at 89.4° C. Its straight line portion can be represented by the formula $V=16.76t^{1.17}$, its angle $\alpha$ with the horizontal being 49° 40'. Curve C represents the difference between curves A and B. Curves A and B rise as substantially straight lines which change their direction abruptly as concentration proceeds. The point D on curve C represents maximum efficiency at the temperature of 89.4° C., which is 2.5 minutes. Point E is the vertical projection of point D on curve B and represents the volume of clear liquor which separates at the point of maximum efficiency. At this point the clear aqueous caustic alkali liquor constitutes about 47.8 per cent. of the total volume and has a caustic alkali content of 7.1 per cent. Point F on curve A is the horizontal projection of point E and represents the time required to accomplish the same concentration of indigo at a temperature of 55.6° C. This is shown as 7 minutes. At this point the vertical downward projection G on the curve C is a minimum. This point G lies below the point D on curve C and therefore represents less than maximum efficiency.

Figure 2 represents a slurry composed of 2.00 per cent. indigo, 7.47 per cent. caustic alkali, and 90.53 per cent. water. Curve A' is plotted on points experimentally determined and represents decantation carried out at 55.5° C., the straight line portion of which can be represented by the formula $V=1.504t^{1.715}$, the angle $\alpha$ being 59° 40'. Curve B' is plotted on points experimentally determined and represents the decantation carried out at 90° C. Its straight line portion can be represented by the formula $V=6.237t^{1.515}$, its angle $\alpha$ with the horizontal being 56° 35'. Curve C' represents the difference between curves A' and B'. The point D' on curve C' which represents maximum efficiency at the temperature of 90° C., lies at 3.2 minutes. The point E' is the vertical projection of point D' on curve B' and represents the volume of clear liquor which separates at the point of maximum efficiency. At this point the clear aqueous caustic alkali liquor constitutes about 34.1 per cent. of the total volume. Point F' on the curve A' is the horizontal projection of point E' and represents the time required to accomplish the same concentration of indigo at a temperature of 55.5° C. This is shown as 12.3 minutes. The first minimum G' on the curve C' does not correspond with the downward projection of point F'. However, a minimum H' occurs at the downward projection of F' on the curve C', showing less than maximum efficiency. Thus the best efficiency of separation is accomplished above room temperature, preferably at about 40° C. to about 90° C. Preferably a temperature of about 90° C. is employed, although it will be understood that temperatures of about 75° to 90° may be employed when practicable.

In each of the above formulas V represents per cent. volume of clear liquor and $t$ represents the temperature at which stratification is performed. The temperature is maintained constant.

Preferably the dilute indigo slurry is prepared at a concentration of about 2 per cent. indigo, although a slurry of 1.25 per cent. to 2.5 per cent. indigo may be employed. The dilution of the slurry is conveniently regulated in the drowning operation referred to above.

Having described my invention what I claim as new and desire to secure by Letters Patent is:

1. The process which comprises concentrating a dilute aqueous slurry of indigo containing caustic alkali in solution by stratification into separate layers while maintaining the slurry at a temperature of 40° to about 90° C., and separating the resulting layers.

2. The process which comprises concentrating a dilute aqueous slurry of indigo containing caustic alkali in solution by stratification into separate layers while supplying sufficient heat to maintain the slurry at a temperature of at least approximately 55° C., and separating the resulting layers by decantation.

3. The process which comprises concentrating a dilute aqueous slurry of indigo containing caustic alkali in dilute solution by stratification into separate layers while supplying sufficient heat to maintain the slurry at a temperature of approximately 55° to about 90° C., and separating the resulting layers by decantation.

4. The process which comprises concentrating a dilute aqueous slurry of indigo containing caustic alkali in solution by stratification into separate layers at a constant temperature within the range of about 75° to about 90° C.

5. The process which comprises concentrating an aqueous slurry containing caustic alkali and about 1.25 to 2.5 per cent. indigo by stratification into separate layers at a temperature of about 40° to about 90° C.

6. The process which comprises concentrating an aqueous slurry containing caustic alkali and about 1.25 to 2.5 per cent. indigo by stratification into separate layers at a temperature of about 75° to about 90° C.

7. The process which comprises concentrating a dilute aqueous slurry containing about 2 per cent. indigo and about 8 per cent. caustic alkali in solution by stratification into separate layers while maintaining the temperature at about 90° C.

8. The process which comprises concentrating a dilute aqueous slurry of indigo containing caustic alkali in dilute solution by stratification into separate layers while maintaining the slurry at a temperature of at least 40° C., and separating the resulting layers by decantation.

DICK WILLIAM van DONGEN.